United States Patent [19]

Bruere et al.

[11] Patent Number: 5,065,105
[45] Date of Patent: Nov. 12, 1991

[54] CAPACITIVE DIMENSIONAL MEASUREMENT CHAIN WITH LINEAR OUTPUT

[75] Inventors: Alain Bruere, Chatenay Malabry; Claude Galaud, Paris, both of France

[73] Assignee: The Office National d'Etudes et de Recherches Aerospatiales Styled O,N.E.R.A., Chatillon, France

[21] Appl. No.: 445,034

[22] Filed: Dec. 1, 1989

[30] Foreign Application Priority Data

Dec. 9, 1988 [FR] France .............................. 88 16244

[51] Int. Cl.$^5$ .............................................. G01R 27/26
[52] U.S. Cl. .................................... 324/662; 324/684; 324/688
[58] Field of Search .............. 324/661, 662, 679, 681, 324/680, 684, 688; 340/870.37

[56] References Cited

U.S. PATENT DOCUMENTS 4,067,225  1/1978  Dorman et al. ................ 324/662 X
4,176,555  12/1979  Dorman .......................... 324/688 X
4,539,835  9/1985  Shambroom et al. .......... 324/662 X

FOREIGN PATENT DOCUMENTS 2608751  6/1988  France .
1047600  11/1966  United Kingdom .

Primary Examiner—Jack B. Harvey
Attorney, Agent, or Firm—Fleit, Jacobson, Cohn, Price, Holman & Stern

[57] ABSTRACT

A capacitive dimensional measurement chain with linear output is essentially comprised of a capacitive sensor formed by a central detection electrode and a guard electrode surrounding the detection electrode that are respectively powered by two a.c. bias voltage sources. The chain also comprises a reference capacitor and a measuring circuit for measuring the distance between the detection electrode and a conductive part placed facing the detection electrode. The bias voltage sources are variable level sources and are level-controlled by a distance measurement signal issued by the measuring circuit. The measuring circuit comprises a level amplifier and a demodulator for amplifying and demodulating an incoming error signal representative of a difference between a load of a sensor capacitance that is defined between the detection electrode and the part separated by the distance to be measured, and a load of the reference capacitor. The distance measurement signal supplied by the measuring circuit linearly represents the distance to be measured.

8 Claims, 2 Drawing Sheets

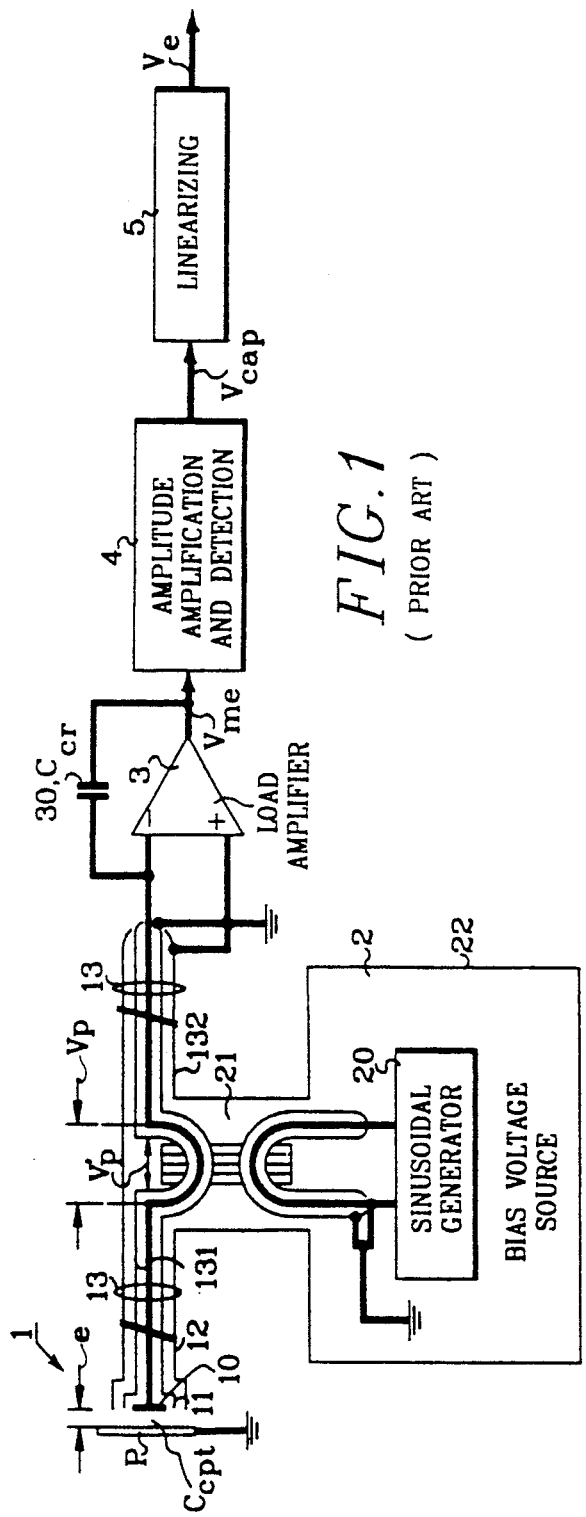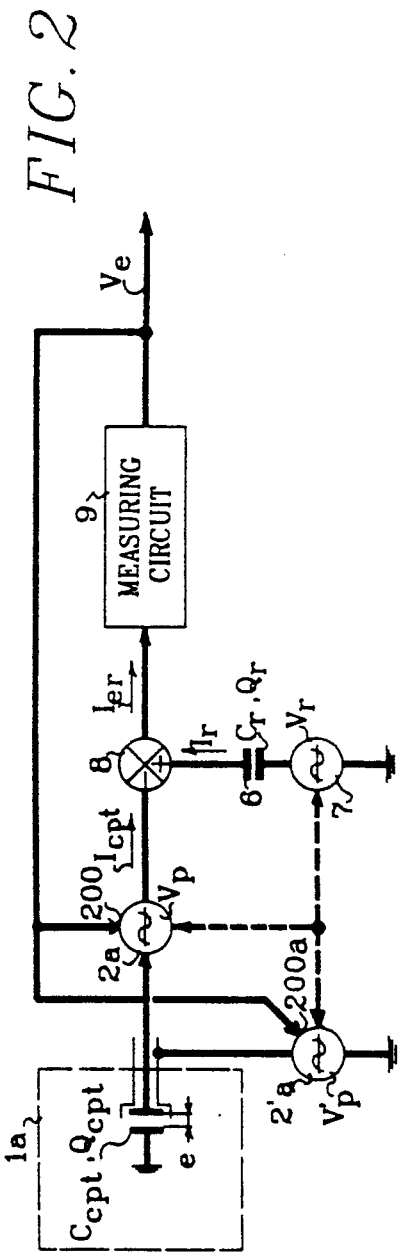

CAPACITIVE DIMENSIONAL MEASUREMENT CHAIN WITH LINEAR OUTPUT

BACKGROUND OF THE INVENTION

1. Field of the Invention

This invention relates to the field of contact-free dimensional measurement in general. More particularly, the invention relates to a capacitive dimensional measurement chain designed to directly produce a measurement signal linearly representing a distance to be measured.

Within this sphere of the technique, there are principally two types of measurement devices in use at present:

impedance measuring bridges, and capacitive measurement chains.

Manual or automatic type impedance measuring bridges are awkward to use, have restricted resolution and can only be used in static operational conditions. Furthermore, they are costly and non-linear as regards dimensional measurement.

2. State of the Prior Art

A capacitive measurement chain such as those disclosed in French patent application No. 2,608,751 delivers a measurement signal representative of a capacitance. The measurement signal is inversely proportional to the distance to be measured and does not therefore represent this distance linearly. A digital or analog linearizing device is also included in the measurement chain so as to linearize the measurement signal. The linearizing device has the disadvantage of introducing additional errors, and consecutively reducing the efficiency of the dimensional measurement.

This disadvantage is avoided in the capacitance measurement chain described in U.S. Pat. No. 4,067,225. The chain comprises an oscillator providing an a.c. reference voltage and powering a standard capacitor. One output terminal of the oscillator is coupled through the standard capacitor to one input of a first amplifier and is coupled by an inner conductor of a coaxial cable to a central electrode of a capacitive sensor. Another output terminal of the oscillator is directly coupled to another input of the first amplifier and is coupled to a guard ring of the sensor through a shielding external conductor of the coaxial cable.

The measurement chain in U.S. Pat. No. 4,067,225 includes a demodulator that is connected to the output of the first amplifier, a low pass filter, another amplifier, a variable gain amplifier, a peak-to-peak detector and an indicating instrument for measuring the distance between the sensor face and a conductive part or body.

In operation, the output voltage of the first amplifier will bear a ratio the input voltage of the first amplifier that is in proportion to the capacitance ratio between the standard capacitor and the capacitor defined by the space between the central sensor electrode and the conductive body, the distance of this space being to be measured. Since the output voltage of the oscillator is constant and known, the current through the standard capacitor is constant and the voltage at the output of the first amplifier will be inversely proportional to the capacitance of the sensor capacitor, and hence directly proportional to the distance to be measured.

Another distance/capacitance measurement chain that also includes a reference voltage oscillator coupled through a standard or reference capacitor to the input of an amplifier that is connected to the capacitive sensor, is also described in U.K. patent No. 1,047,600.

Nevertheless, the measuring voltage outgoing from the prior measurement chains is not precisely stabilized on temperature and time. The measuring voltage from which the distance is deduced depends on a quasi-constant current powering the sensor and varying slowly in dependence on temperature and time.

OBJECTS OF THE INVENTION

The object of this invention is to provide a capacitive dimensional measurement chain with linear output obviating the preceding disadvantages.

Another object of the invention is to stabilize the measurement in a capacitance measurement chain in which the measuring voltage is proportional to the distance to be measured and thus inversely proportional to the capacitance of the sensor.

SUMMARY OF THE INVENTION

Accordingly, a capacitive dimensional measurement chain comprises a capacitive sensor formed by a detection electrode and a guard electrode surrounding the detection electrode, the detection electrode being placed facing a conductive part thereby defining a sensor capacitance, a reference capacitor powered by an a.c. reference voltage source deriving a reference signal, means for producing a signal modulated in amplitude as a function of a difference between currents respectively crossing the sensor capacitance and the reference capacitor, means for amplifying and demodulating the amplitude modulated signal into a distance measurement signal linearly representative of a distance between the detection electrode and the conductive part, and two a.c. voltage sources providing signals that have a same amplitude, that have frequencies and phases equal to those of the reference signal and that respectively power the detection electrode and the guard electrode, said two sources being level-controlled by said distance measuring signal.

Compared to one of the most efficient capacitive dimensional measurement chains with linearized output embodying the prior art, a measurement chain embodying the invention associated with a capacitive sensor with similar characteristics has a measurement range four times greater and reduces linearity errors by a factor substantially equal to 8.

The voltage powering the sensor is controlled by the measuring voltage outgoing from the chain, and therefore, the sensor is powered with a constant electrical load, i.e. constant electrical quantity, and not with a quasi-constant current. The chain embodying the invention has a better linearity and a greater temperature and time stability.

BRIEF DESCRIPTION OF THE DRAWING

The foregoing and other objects, features and advantages of the invention will be apparent from the following detailed description of several preferred embodiments of the invention with reference to the corresponding accompanying drawings in which:

FIG. 1 is a block diagram of a capacitive dimensional measurement chain with linearized output embodying the prior art;

FIG. 2 is a theoretical block diagram of a capacitive dimensional measurement chain embodying the invention.

DESCRIPTION OF THE PREFERRED EMBODIMENTS

Figure 3:
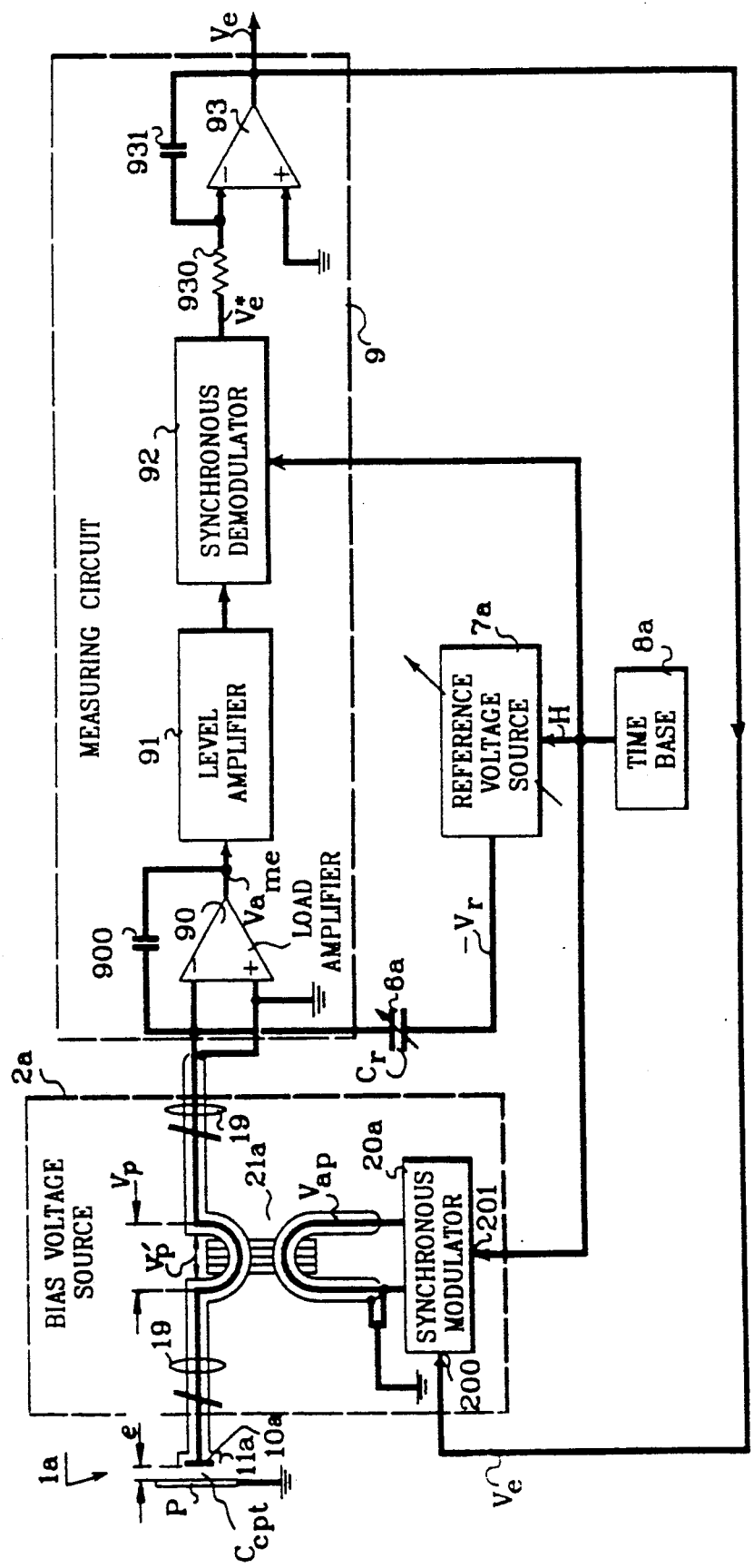
FIG. 3 is a detailed block diagram of a preferred embodiment of a measurement chain embodying the invention.

In reference to FIG. 1, a capacitive dimensional measurement chain with linearized output embodying the prior art comprises a capacitive sensor 1 formed by a detection electrode 10 and a guard electrode 11 surrounding the detection electrode, a bias voltage source 2, triaxial electrical links 13, a load amplifier 3, an amplitude amplifying and detecting circuit 4, and a linearizing device 5.

The purpose of the measurement chain is to produce a distance measurement signal $V_e$ representative of a distance e between the central electrode 10 of the sensor 1 and a conductive part P placed facing the sensor 1, parallel to the electrode 10, and connected to a ground terminal.

Bias voltage source 2 is included in series between the sensor 1 and load amplifier 3 and supplies a first sinusoidal signal $V_p$ thereby biasing the detection electrode 10 of the sensor 1. Source 2 also supplies a second sinusoidal signal $V'_p$ of which the amplitude and phase are the same as those of the signal $V_p$, thereby biasing the guard electrode 11 of the sensor and a guard conductor 131 of the triaxial links 13. The voltage source 2 comprises a sinusoidal generator 20 and a transformer 21 of which primary and secondary windings are in coaxial cables. The primary winding of transformer 21 is powered by the sinusoidal generator 20. The secondary winding of transformer 21 issues the bias signals $V_p$, $V'_p$ and is connected to sensor 1 and to load amplifier 3 via triaxial links 13. The central conductor which forms the core of the coaxial cable in links 13 is connected at one of its ends to the detection electrode 10, and at the other extremity to an inverse input (−) of the load amplifier 3. Likewise, the shielding of the coaxial cable in links 13 is connected to the guard electrode and to a direct input (+) of the load amplifier 3 as well as to the ground. A complete electric guard of the circuits ensuring bias of the sensor is thus produced, from the load amplifier to the detection electrode. A ground wire 132 from the triaxial links 13 is connected to the ground terminal and to the electrode 12 of sensor 1. An electromagnetic shielding 22 of the voltage source 2 is connected to the ground terminal and to the ground wire 132 in triaxial links 13 so as to make the link impervious to electromagnetic radiations.

The amplifier 3 is of the operational amplifier type. The direct input (+) of the amplifier 3 is connected to the ground terminal. A capacitor 30 of capacitance $C_{cr}$ is placed in negative feedback between an output and the inverse input (−) of the amplifier 3.

The amplifier 3 issues a sinusoidal measurement signal $V_{me}$ modulated in amplitude as a function of a sensor capacitance $C_{cpt}$ that is essentially determined by the distance e between the central electrode 10 of sensor 1 and the part P facing it. The signal $V_{me}$ is expressed by the following equality:

$$V_{me} = V_p \cdot C_{cpt}/C_{cr}.$$

The amplitude amplifying and detecting circuit 4 produces from the signal $V_{me}$ a capacitance measurement signal $V_{cap}$ of which the amplitude is proportional to the sensor capacitance $C_{cpt}$.

The distance e to be measured is an inverse function of the sensor capacitance $C_{cpt}$ so that the signal $V_{cap}$ produced by the circuit 4 is not linearly representative of the distance e.

The linearizing device 5 is e.g. comprised of a digital computer fitted forward of a sampling and digitizing circuit. The device 5 is programmed for the calculation of an inverse function of the $F(x) = 1/x$ type, whereby x is the variable. The signal $V_{cap}$ is applied at the input of the linearizing device 5. The device 5 issues the distance measurement signal $V_e$ linearly representative of the distance e.

In reference to FIG. 2, the operation principle of a capacitive dimensional measurement chain with linear output embodying the invention is described.

The measurement chain comprises a capacitive sensor 1a comprising a guard electrode and schematically represented by a sensor capacitor of capacitance $C_{cpt}$, two a.c. bias voltage sources 2a, 2'a, a reference capacitor 6 of capacitance $C_r$, an a.c. reference voltage source 7, a current subtracter 8, and a measuring circuit 9.

The a.c. voltage sources 2a, 2'a and 7 operate in synchronism and respectively supply: the bias voltage $V_p$ for the detection electrode, the bias voltage $V'_p$ for the guard electrode, and a reference voltage $V_r$. The voltages $V_p$, $V'_p$ and $V_r$ have the same frequency, their waveform is sinusoidal or square and they are synchronous in phase. The voltages $V_p$ and $V'_p$ have the same amplitude.

The bias voltage sources 2a and 2'a are of the controlled-level type. The amplitude of the voltages $V_p$ and $V'_p$ depends on a level control signal applied at an input 200 of the source 2a and to an input 200a of the source 2'a.

According to the invention, the distance measurement signal $V_e$ available at output of the measuring circuit 9 is applied to input 200 of the source 2a and to input 200a of the source 2'a and controls the level of the voltages $V_p$ and $V'_p$ according to the relation:

$$V_p = V'_p = K_p \cdot V_e,$$

whereby $K_p$ is a proportionality coefficient.

According to another embodiment, the distance measurement signal $V_e$ does not control directly the sources 2a and 2'a as shown in FIG. 2, but via a filtering and phase correcting circuit intended to improve the stability of the measurement chain.

The capacitive sensor 1a and the reference capacitor 6 of capacitance $C_r$ are crossed by currents $I_{cpt}$ and $I_r$ and have electrical load quantities $Q_{cpt}$ and $Q_r$ respectively. The currents $I_{cpt}$ and $I_r$ respectively power inverse (−) and direct (+) inputs of the current subtracter 8.

The subtracter 8 produces an error current $I_{er} = I_r - I_{cpt}$. The error current $I_{er}$ is supplied at an input of the measuring circuit 9.

The measuring circuit 9 essentially comprises an operational amplifier with capacitive negative feedback, and level amplifying, synchronous demodulating and filtering means (not represented) thereby deriving the distance measurement signal $V_e$ representative of the distance e to be measured.

When the measurement chain operates in static or dynamic operational conditions, in its frequency range, the error current $I_{er}$ supplied by the subtracter 8 tends towards an amplitude zero and the electrical load quantities $Q_{cpt}$ and $Q_r$ respectively in sensor capacitance 1 and in reference capacitor 6 tend towards the same value. The loads $Q_{cpt}$ and $Q_r$ are expressed by the equalities $$Q_{cpt} = C_{cpt} V_p$$

and $$Q_r = C_r V_r$$

whence the relation:

$$V_p = V_r(C_r/C_{cpt}).$$

From this relation is deducted the following expression of the distance measurement signal $V_e$:

$$V_e = (V_r/K_p) \cdot (C_r/C_{cpt}),$$

whereby $V_r$ denotes the amplitude of the reference signal.

This expression shows that the signal $V_e$ is inversely proportional to the sensor capacitance $C_{cpt}$. The distance measurement signal $V_e$ in the measurement chain embodying the invention is indeed therefore directly proportional to the distance e.

In reference to FIG. 3, a preferred embodiment of the measurement chain embodying the invention is now described in detail.

The measurement chain comprises a capacitive sensor 1a, a bias voltage source 2a, a coaxial cable 19, a reference capacitor 6a associated with a reference voltage source 7a, a time base 8a, and a measuring circuit 9.

The capacitive sensor 1a differs from the capacitive sensor 1 shown in FIG. 1 in that it does not comprise a ground electrode 12 and is therefore less costly. A central detection electrode 10a and a guard electrode 11a are respectively connected to first ends of a central conductor and an exterior shielding conductor in the coaxial cable 19.

The bias source 2a comprises a synchronous modulator 20a and a coaxial cable transformer 21a.

The synchronous modulator 20a receives the distance measurement signal $V_e$ via a level control input 200 and a clock signal H via a clock input 201. The clock signal H is produced by the time base 8a. The modulator 20a issues an a.c. signal $V_{ap}$ that is synchronous with the clock signal H. The signal $V_{ap}$ powers a primary winding of the transformer 21a.

The coaxial cable transformer 21a is analogous to the transformer 21 shown in FIG. 1. A secondary winding of the transformer 21a is preferably comprised by a portion of the coaxial cable 19 wound around a magnetic core of the transformer 21a. The core of the secondary winding of the transformer 21a issues the bias voltage $V_p$ of the detection electrode 10a of the sensor. The shielding of the secondary winding issues the bias voltage $V'_p$ of the guard electrode. This disposition enables the voltage sources 2a and 2'a of FIG. 2 to be produced. The capacitor 6a and the reference source 7a are preferably of the adjustable type so as to enable adjustments of the value of the capacitance $C_r$ of the capacitor 6a and of the amplitude of the reference voltage $-V_r$ supplied by the reference source 7a.

The reference voltage source 7a receives the clock signal H supplied by the time base 8a and provides the a.c. reference voltage $-V_r$ which is of the same nature as the detection and guard electrode bias voltages $V_p$ and $V'_p$. The reference voltage $-V_r$ has the same frequency as detection and guard electrode bias voltages $V_p$ and $V'_p$, but is of opposite phase to these thereby producing an error current, by addition of two currents of opposite signs, at an inverse input $(-)$ of a load amplifier 90 included in the measuring circuit 9.

In addition to the load amplifier 90, the measuring circuit 9 comprises a level amplifier 91, a synchronous demodulator 92, and an integrator 93.

The load amplifier 90 is comprised of an operational amplifier with capacitive negative feedback. An inverse input $(-)$ of the amplifier 90 is connected to the core of a second end of the coaxial cable 19 and, via capacitor 6a, to an output of the reference voltage source 7a. A direct input $(+)$ of the amplifier 90 is connected to the ground terminal as well as to the guard conductor of the cable 19. A capacitor 900 is placed in negative feedback between an output and the inverse input $(-)$ of the amplifier 90. The amplifier 90 issues a measurement signal $Va_{me}$ having, as fundamental frequency, the frequency of the clock signal H.

The level amplifier 91 and the synchronous demodulator 92 are placed in cascade between the load amplifier 90 and the integrator 93. The purpose of the level amplifier 91 is to amplify the measurement signal $Va_{me}$ to a sufficiently high level to enable it to be processed by the synchronous demodulator 92. The synchronous demodulator 92 is controlled by the clock signal H so as to demodulate the measurement signal $Va_{me}$ into a signal $V^*_e$ from which the distance measurement signal $V_e$ is deduced by integration.

The integrator 93 is traditionally comprised of an operational amplifier and its purpose is to produce the distance measurement signal $V_e$ by integration of the signal $V^*_e$. A secondary purpose of the integrator 93 is to ensure operating stability in the measurement chain by introducing a phase delay of $-\pi/2$ in the control loop. The integrator 93 receives the signal $V^*_e$ by an inverse input $(-)$ via a resistor 930. A direct input $(+)$ of the integrator 93 is connected to the ground terminal. A capacitor 931 is placed in negative feedback between an output and the inverse input $(-)$ of the integrator 93. The integrator 93 issues the distance measurement signal $V_e$.

The principal characteristics of the embodied measurement chain, associated with a capacitive sensor of which the detection electrode has a diameter of 1 mm and the guard ring has a width of 1.25 mm, are listed below:

measurement range 0 to 2.5 mm;
linearity
    $< \pm 0.15$ µm between 0 and 1 mm;
    $< \pm 0.5$ µm between 1 and 2.5 mm;
temperature drift $< 10^{-5}$ of the measurement range/°C.;
resolution in a frequency band of 0 to 1 Hz $< 20$ nm corresponding to a capacitance of $2.10^{-19}$ F.;
passband of the direct-current at 200 Hz.

For comparison purposes, the known impedance measuring bridges rely on the use of eddy currents and associated with an inductive sensor having the same dimensions as the capacitive sensor above, have the following characteristics (Kaman Sciences Corporation):

measurement range 0 to 1.27 mm;

linearity < ±12 μm;
resolution < 0.12 μm.

What we claim is:

1. A capacitive dimensional measurement chain with linearized output comprising:
   a capacitive sensor formed by a detection electrode and a guard electrode surrounding said detection electrode, said detection electrode being placed facing a conductive part thereby defining a sensor capacitance,
   a reference alternating voltage source for generating a reference signal,
   a reference capacitor powered by said reference alternating voltage source,
   means for producing an amplitude modulated signal modulated as a function of a difference between currents respectively supplied in said sensor capacitance and said reference capacitor,
   means for generating two a.c. voltage source signals having an identical amplitude and in phase with said reference alternating voltage source, said two source signals being level-controlled by a distance measuring signal for supplying a current to said sensor capacitance which is identical to the current supplied to said reference capacitor,
   means for amplifying and demodulating said amplitude modulated signal with respect to the phase of the two a.c. voltage source signals to generate said distance measurement signal linearly representative of a distance between said detection electrode and said conductive part.

2. A measurement chain as claimed in claim 1, further comprising:
   a time base for producing a clock signal to synchronize the reference alternating voltage source to the two a.c. voltage source signals, and
   said means for amplifying and demodulating comprising a demodulator for demodulating the amplified amplitude modulated signal to generate a preliminary distance measurement signal and means for integrating said preliminary distance measurement signal to generate said distance measurement signal.

3. The measurement chain as claimed in claim 1, wherein said reference capacitor is of adjustable type.

4. The measurement chain as claimed in claim 1, wherein said reference alternating voltage source is of adjustable level type.

5. The measurement chain as claimed in claim 1, wherein said means for generating the two a.c. voltage source signals comprises:
   a transformer having primary and secondary windings in respective coaxial cables,
   means for generating a primary driving signal in accordance with said distant measurement signal and synchronized to said reference alternating voltage source,
   said secondary winding being disposed in series between said sensor and said means for producing via electric links,
   a central conductor of said secondary winding coaxial cable connected at one end to said detection electrode and at the other end to a first input of said means for producing,
   a shielding of said secondary winding coaxial cable connected at one end to said guard electrode and at the other end to a second input of said means for producing, and
   a central conductor of said primary winding coaxial cable being powered by said primary driving signal.

6. The measurement chain as claimed in claim 5, wherein said links are coaxial cables.

7. The measurement chain as claimed in claim 5, wherein said links are triaxial links.

8. The measurement chain as claimed in claim 6, wherein said conductive part, said second input of said producing means and one of the ends of a shielding of said primary winding coaxial cable of said transformer are connected to a ground terminal.

* * * * *